United States Patent
Menon et al.

(10) Patent No.: US 6,344,240 B1
(45) Date of Patent: Feb. 5, 2002

(54) METHOD OF PREPARING HYDROPHOBIC SILICA

(75) Inventors: Vinayan C. Menon; Douglas M. Smith, both of Albuquerque, NM (US); Kenneth C. Koehlert, Champaign, IL (US)

(73) Assignee: Cabot Corporation, Boston, MA (US)

( * ) Notice: Subject to any disclaimer, the term of this patent is extended or adjusted under 35 U.S.C. 154(b) by 0 days.

(21) Appl. No.: 09/231,365

(22) Filed: Jan. 13, 1999

Related U.S. Application Data

(60) Provisional application No. 60/071,080, filed on Jan. 15, 1998, and provisional application No. 60/071,359, filed on Jan. 15, 1998.

(51) Int. Cl.[7] .......................... B05D 7/00; C01B 33/149; B01J 13/00
(52) U.S. Cl. ...................... 427/220; 427/352; 516/100; 106/490; 428/405
(58) Field of Search .................. 516/100; 427/219, 427/220, 352; 428/405; 106/490

(56) References Cited

U.S. PATENT DOCUMENTS

| | | | |
|---|---|---|---|
| 2,739,075 A | 3/1956 | Iler | 516/34 |
| 2,786,042 A | 3/1957 | Iler | 516/79 |
| 3,015,645 A | 1/1962 | Tyler | 528/12 |
| 3,122,520 A | 2/1964 | Lentz | 106/490 |
| 3,652,214 A | 3/1972 | Aboutboul et al. | 423/338 |
| 3,789,009 A | 1/1974 | Irani | 516/83 |
| 3,830,738 A * | 8/1974 | Contrell | 428/405 |
| 3,839,221 A | 10/1974 | Irani | 516/83 |
| 3,948,676 A | 4/1976 | Laüfer | 427/215 |
| 3,963,627 A * | 6/1976 | Contrell | 428/405 |
| 4,054,689 A | 10/1977 | Calvin | 106/490 |
| 4,554,147 A * | 11/1985 | Stoll et al. | 427/219 |
| 5,652,017 A * | 7/1997 | Osaheni et al. | 427/215 |
| 5,919,298 A * | 7/1999 | Griffith et al. | 106/490 |
| 6,090,439 A * | 7/2000 | Menon et al. | 427/215 |

FOREIGN PATENT DOCUMENTS

| | | |
|---|---|---|
| DE | 40 33 876 | 4/1992 |
| EP | 0 251 176 A2 | 1/1988 |
| EP | 0 382 370 A1 | 8/1990 |
| FR | 2078599 | 11/1971 |
| FR | 2 145 702 | 2/1973 |
| GB | 663 013 | 12/1951 |
| GB | 682574 | 11/1952 |
| GB | 783868 | 10/1957 |
| GB | 1 006 845 | 10/1965 |
| GB | 1 071 060 | 6/1967 |
| GB | 1 103 819 | 2/1968 |

OTHER PUBLICATIONS

Patent Abstracts of Japan, vol. 11, No. 38 (C–401) (JP–A–61–204113—Kao Corp.) (Feb. 4, 1987).
Derwent World Patents Index, Accession No. 1990–316859 (JP–A–2–226066—Nakarai Test KK) (Sep. 7, 1990), week 199042.
Sato et al., *Chemical Abstracts*, 105(20), abstract. No. 175242, (Nov. 17, 1986), pp 158.

* cited by examiner

*Primary Examiner*—Daniel S. Metzmaier

(57) ABSTRACT

The present invention provides a method of treating silica, wherein dry silica is contacted with a reaction medium consisting essentially of concentrated aqueous acid and a hydrophobing agent selected from the group consisting of organosiloxanes and organochlorosilanes. The silica is then reacted with the hydrophobing agent in the reaction medium for about 90 minutes or less at a temperature from about 10° C. to about 40° C. to provide a hydrophobic treated silica. The hydrophobic treated silica then is recovered.

29 Claims, No Drawings

METHOD OF PREPARING HYDROPHOBIC SILICA

This patent application claims the benefit of U.S. Provisional Patent Application Nos. 60/071,080 filed Jan. 15, 1998 and 60/071,359 filed Jan. 15, 1998.

TECHNICAL FIELD OF THE INVENTION

The present invention generally relates to methods for the surface modification of silica.

BACKGROUND OF THE INVENTION

Silica, found in ordinary sand, is an abundant inorganic material having silicon dioxide ($SiO_2$) as a basic structural unit. Due in part to its natural abundance and ready accessibility, a significant amount of research and development has been undertaken regarding methods for refining silica and for its use. Some of this research has resulted in the discovery of different types of silica particles, which in turn can be used in a number of commercial applications. Exemplary of these particles are fumed silica and precipitated silica.

Fumed silica is a material having a relatively small particle size, about 2–20 nm. Although it can be formed using a variety of processes, it is most commonly prepared in a vapor phase. For example, raw silica (typically sand) is vaporized at about 2000° C., and cooled to form fumed silica. Alternatively, raw silica can be sublimed at about 1500° C. in the presence of a reducing agent (e.g., coke) to form SiO, which is then oxidized to form fumed silica.

Precipitated silica is a particulate that can have an average diameter of from about 2 nm to greater than about 1 $\mu$m. This silica is typically prepared by coagulation of silica particles from an aqueous solution.

Another common form of silica is colloidal silica. This silica is characterized by a stable dispersion of amorphous silica particles in water. Colloidal silica, however, also can be provided in non-aqueous liquids.

When placed into solution, silica can exhibit polymerization behavior. In an aqueous medium, silica dissolves (and/or depolymerizes) to form $Si(OH)_4$, which in turn undergoes polymerization to form discrete particles with internal Si—O—Si bonds and external (on the particle surface) Si—OH bonds. Generally, under neutral or alkaline conditions (pH 7 or greater), the silica particles will tend to agglomerate, first forming chains, and eventually three dimensional structures. This agglomeration may be enhanced if salts are present, the salts tending to neutralize the charge produced on the particle surface.

The formation of a stable dispersion of discrete, colloid-sized silica particles in a solution is referred to as a sol. Under appropriate storage conditions, sols do not gel or settle even after several years of storage, and can contain up to about 50 wt. % silica and have particle sizes up to about 300 nm. As alluded to previously, a sol can be formed, for example, by agglomerating silica particles to the desired size in a weakly alkaline solution, or by the addition of dilute acid to a solution of sodium silicate (e.g., $NaSiO_3$) with rapid mixing until the pH is about 8–10, followed by removal of $Na^+$.

Silica sols can be used to form gels. A gel is a coherent, rigid, continuous three-dimensional structure of silica particles. The preparation of a gel is typically provided by contacting the silica with an acid in the absence of neutralizing salts. The creation of a gel, however, also may depend upon other factors, including the silica particle size and nature of the silica particle surface.

Various types of gels can be formed, including hydrogels, alcogels, and organogels. As its name implies, a hydrogel is a gel in which the pores (the spaces within the gel microstructure) are filled with water. Similarly, an alcogel is a gel in which the pores are filled with an alcohol, while an organogel is a gel in which pores are filled with an organic liquid. When a gel is dried by a means which collapses the coherent gel microstructure (e.g., by evaporation), a relatively high density powder, commonly referred to as a xerogel, is formed. In contrast, when a gel is dried so that the gel structure is preserved (e.g., by supercritical drying, such as that described in U.S. Pat. No. 3,652,214), a low density powder, commonly referred to as an aerogel, is formed.

Aerogels have very unusual, yet highly desirable, properties. They can be hydrophilic or converted to a hydrophobic species by the introduction of hydrophobic functional groups to their surface. They also are substantially optically transparent and possess extremely low density and a low thermal conductivity. They are used in a wide variety of applications, including in thermal insulators and as reinforcing fillers in elastomers.

Although raw material costs are very low, the costs of processing the various silica particles, including imparting hydrophobicity to the particles, has been high. Further, it is desirable for the hydrophobic groups to be introduced onto the particles in a dense and uniform manner. This has traditionally required resort to relatively high cost difunctional hydrophobic reagents, such as hexamethyldisiloxane (HMDS) and hexamethyldisilazane (HMDZ). While some progress has been made on the economic front, the development of processes that provide high quality aerogels while offering cost savings over traditional processes has lagged.

U.S. Pat. Nos. 2,739,075 and 2,786,042 are relatively early disclosures of surface-modified silicas and general methods for their preparation. U.S. Pat. Nos. 3,015,645 and 3,122,520 disclose methods for providing improved reinforcing silica fillers, e.g., aerogels, for silicone rubber. The method set forth in the '520 patent comprises heating a silica hydrosol under strong acid conditions (e.g., HCl at a pH of 1 or less) prior to reacting the silica hydrosol with a hydrophobing agent. The resulting silica is a hydrophobic aerogel having a surface area of from 100 to 650 $m^2/g$ as determined by the Brunauer theory (BET measurement).

Despite the knowledge provided by the foregoing, there remains a need for a method which can provide acid-treated silica particles in a manner that is more economical than those presently utilized, while not having any undue deleterious effect on the degree to which the silica can be hydrophobicized, the uniformity thereof, or the physical properties of any gel used in preparing or produced from those hydrophobic surface-treated particles, such as density, surface area, and the like. The present invention provides such a method.

BRIEF SUMMARY OF THE INVENTION

The present invention provides a method of treating silica, wherein dry silica is contacted with a reaction medium consisting essentially of concentrated aqueous acid and a hydrophobing agent selected from the group consisting of organosiloxanes and organochlorosilanes. The silica is then reacted with the hydrophobing agent in the reaction medium for about 90 minutes or less at a temperature from about 10° C. to about 40° C. to provide a hydrophobic treated silica. The hydrophobic treated silica then is recovered.

DETAILED DESCRIPTION OF THE PREFERRED EMBODIMENTS

The present invention provides an improved method for the treatment of silica, particularly the preparation of hydrophobic silica. The present inventive method generally involves contacting a dry silica with a reaction medium consisting essentially of concentrated aqueous acid and a hydrophobing agent selected from the group consisting of organosiloxanes and organochlorosilanes. The silica then is reacted with the hydrophobing agent in the reaction medium for about 90 minutes or less at a temperature from about 10° C. to about 40° C. to provide a hydrophobic treated silica. The hydrophobic treated silica then is recovered.

While not intending to be bound by any particular theory, it is believed that the absence of excess water in the composition allows the concentrated acid to remain at a relatively high concentration during the reaction process, as opposed to being diluted by the introduction of secondary water sources, including, for example, by adding water itself to the system or via significantly wet silica. This dilution is believed to result in an undesirably lengthy hydrophobic-treatment processing time, which lowers the efficiency of the overall silica surface-treatment process.

The dry silicas that can be utilized in the present inventive method are preferably silica powders that are substantially water-free. By "substantially water free" is meant that the silica contains no water or has an adsorbed water content which is so low that the concentration of acid in the reaction medium would not be reduced by more than about 15% as a result of dilution from the adsorbed water. Advantageously, the silica will be substantially completely water-free, i.e., containing less than about 5 wt. % water, and, preferably, the silica will be water-free, i.e., containing less than about 1 wt. % water.

The dry silica to be subjected to the method of the present invention can comprise any suitable silica (typically in the form of particles), and advantageously those that are desired subsequently to be rendered hydrophobic. Exemplary of those dry silicas include fumed silica and precipitated silica. Silica aerogels and xerogels also can be processed in accordance with the method of the present invention. For example, a suitable dry silica can exist as a gel and can be treated according to the method of the present invention to provide a hydrophobic silica gel, which then can be further processed to provide a hydrophobic aerogel using any of a number of suitable methods known to those skilled in the art.

Fumed silica is a preferred silica in the method of the present invention. Preferably, the fumed silica is not gelled prior to treatment with the hydrophobing agent.

The concentrated aqueous acid used in the composition can be any suitable concentrated aqueous acid, typically one or a combination of any of a number of concentrated mineral acids. Preferably, hydrochloric acid, sulfuric acid, or combinations thereof are used, with hydrochloric acid being the most preferred. It will be appreciated by one of ordinary skill in the art that the concentration of fully saturated aqueous acids vary depending on the type of acid used. For example, fully saturated hydrochloric acid (also known as concentrated hydrochloric acid) is about 12 M HCl, whereas fully saturated sulfuric acid is about 18 M $H_2SO_4$. It also will be appreciated by one of ordinary skill in the art that the acid concentration of the "concentrated acid" in the reaction medium can vary depending on the amount of residual water present in the dry silica and the amount of silica used. Further, the hydrophobing agent can be partially soluble in the acid phase and reduce the acid concentration thereby.

Typically, however, the hydrophobing agent, being hydrophobic, is relatively insoluble in the concentrated aqueous acid, and thereby forms a separate phase in the reaction medium. The term "concentrated" as used with respect to the aqueous acid of the reaction medium herein refers to a substantially saturated aqueous acid solution.

By "substantially saturated" is meant that the concentrated acid in the reaction medium has an acid concentration of at least about 85% of the fully saturated concentrated acid. Accordingly, if hydrochloric acid is used as the concentrated acid of the reaction medium of the present invention, the concentration of HCl is at least about 10 M, preferably at least about 11 M, more preferably greater than 11 M, most preferably about 12 M. Similarly, if sulfuric acid is used, the concentration of $H_2SO_4$ is at least about 15 M, preferably at least about 16 M, more preferably at least about 17 M, and most preferably about 18 M. Advantageous results are seen with increasing acid molarity, although the precise reason for this effect is not fully appreciated at present. When such acids are used, the pH of the composition should be no greater than about 1, e.g., between 0 and 0.5, and preferably below about 0.

The reaction conditions of the present invention are highly advantageous in that the hydrophobic surface modification of silica can be accomplished using relatively brief reaction times and low reaction temperatures.

Any suitable reaction time can be utilized in the reaction of silica with the hydrophobing agent. Advantageously, lengthy reaction times are not required in the method of the present invention. Of course, the reaction time required for reacting a particular sample of dry silica with a hydrophobing agent depends on several factors such as, for example, the type of silica utilized (e.g., particle size, aggregation state, and concentration of silanol groups on the silica surface), the type of acid used in the reaction medium, and the reactivity of the hydrophobing agent. Preferably, the reaction time is about 3 hours or less, more preferably about 2 hours or less, and most preferably 1.5 hours (i.e., 90 minutes) or less. In a preferred embodiment, the reaction time is about 45 minutes or less.

Preferably, the reaction is at a temperature between about 10° C. and about 100° C., more preferably between about 10° C. and about 60° C., and most preferably between about 10° C. and about 40° C. In a preferred embodiment, the reaction is carried out at ambient temperature (e.g., about 20–25° C.)

Of course, the treatment of silica according to the method of the present invention can be accomplished in even shorter time by using higher temperature such as, for example, by refluxing the mixture at atmospheric pressure (e.g., about 80–110 kPa (about 600–800 torr)) or by refluxing the mixture at elevated pressures, advantageously at least about 120 kPa (about 900 torr), preferably at least about 210 kPa (about 1600 torr), more preferably at least about 330 kPa (about 2500 torr), and most preferably at least about 490 kPa (about 3700 torr).

Any suitable hydrophobing agent can be used in the method of the present invention. For example, known processes have utilized relatively expensive and reactive hexamethyldisilazane (HMDZ) in order to provide hydrophobic surface-treated silica. Lower cost hydrophobing agents such as, for example, organosiloxanes (which are substantially less reactive than HMDZ) and organochlorosilanes (which are poorly soluble in aqueous acid media) have typically been used in combination with cosolvents such as, for example, isopropanol. Further, current methods for the acid-mediated hydrophobic surface modification of silica using organosiloxanes such as, for example, hexamethyldisiloxane (HMDS) and organochlorosilanes such as, for example, trimethylchlorosilane (TMCS) typically are carried out in aqueous acid media which are not substantially saturated in acid. Surprisingly, it has been discovered that the acid-mediated hydrophobic surface modification of silica is enhanced by eliminating excess water from the reaction medium. For example, when dry fumed silica is treated in accordance with the present method, relatively low cost hydrophobic reactants, such as trimethylchlorosilane (TMCS) and hexamethyldisiloxane (HMDS), can be utilized under mild conditions while providing a relatively high degree of hydrophobic surface treatment per unit of surface area and uniform coverage. Surprisingly, no cosolvent is required when such hydrophobing agents are utilized in accordance with the present invention. The absence of a cosolvent is highly advantageous, for example, by lowering production cost. Further, the absence of a cosolvent such as, for example, isopropanol, simplifies the recovery of materials for disposal and recycle. For example, recovery of HCl vapors liberated in the reaction process is simplified by the absence of cosolvent vapors, which typically must be separated. Further, since the hydrophobing agents are typically hydrophobic, recovery of the hydrophobing agents is simplified in the absence of an organic cosolvent, which also typically must be separated. Similarly, recovery of the concentrated aqueous acid of the reaction medium is facilitated in the absence of a cosolvent. Processing conditions relating to the hydrophobing of silica are well known and can be readily adapted to the present method by those skilled in the art.

The hydrophobing agent preferably is at least one organosiloxane of the formula

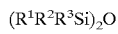

wherein $R^1$, $R^2$, and $R^3$ may be the same or different and each is a $C_1$–$C_6$ alkyl, fluoroalkyl, aryl, or arylalkyl. For example, $R^1$, $R^2$, and $R^3$ may each be $C_1$–$C_3$ alkyl, and advantageously each may be methyl. Preferably, $R^1$, $R^2$, and $R^3$ are methyl, in which case the hydrophobing agent is hexamethyldisiloxane (HMDS).

Also preferred are organosiloxanes of the formula:

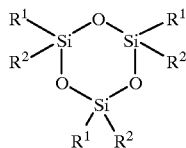

wherein $R^1$ and $R^2$ may be the same or different and each is a $C_1$–$C_6$ alkyl, fluoroalkyl, aryl, or arylalkyl. Preferably, $R^1$ and $R^2$ are methyl.

Another organosilicon compound that may be advantageously used as a hydrophobing agent in connection with this aspect of the present invention are organosiloxanes of the formula

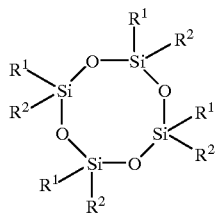

wherein $R^1$ and $R^2$ may be the same or different and each is a $C_1$–$C_6$ alkyl, fluoroalkyl, aryl, or arylalkyl. With respect to each of the foregoing formulas for the hydrophobing agent, it is preferred that $R^1$ and $R^2$ are the same and more preferred that each is a $C_1$–C6 alkyl, while it is most preferable that each is methyl.

Any suitable organochlorosilane can be used in the method of the present invention. Preferably, the organochlorosilane is a compound of the formula:

wherein $R^1$, $R^2$, and $R^3$ may be the same or different and each is a $C_1$–$C_6$ alkyl, fluoroalkyl, aryl, or arylalkyl. While each of $R^1$, $R^2$, and $R^3$ preferably is a $C_1$–$C_3$ alkyl, each is more preferably methyl. Most preferably, the hydrophobing agent is chlorotrimethylsilane or dimethyldichlorosilane.

Another advantageous hydrophobing agent is a linear organosiloxane of the formula:

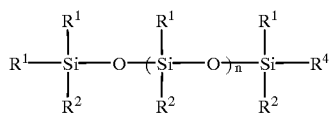

wherein n is an integer from 0 to 10; $R^1$ and $R^2$ may be the same or different and each is a $C_1$–$C_6$ alkyl, fluoroalkyl, aryl, or arylalkyl; and $R^3$ and $R^4$ may be the same or different and each is hydroxyl, $C_1$–$C_6$ alkyl, fluoroalkyl, aryl, or arylalkyl. By way of example, $R^1$ and $R^2$ may be $C_1$–$C_3$ alkyl, and, more advantageously, each is methyl. In one preferred embodiment, the linear organosiloxane is octamethyltrisiloxane (n is 1, and $R^1$14 R4 are methyl). Also preferred are hydroxy-terminated linear organosiloxanes, wherein $R^3$ is hydroxyl and $R^4$ is $C_1$–$C_6$ alkyl, preferably methyl, or both $R^3$ and $R^4$ are hydroxyl.

Those of ordinary skill in the art will readily appreciate the conditions under which the foregoing hydrophobing reaction can be undertaken and the means by which the resulting hydrophobed silica (e.g., based upon fumed, precipitated, aerogel, or xerogel silica) can be recovered. In one preferred embodiment, the dry silica used is fumed silica, the concentrated acid in the reaction medium is hydrochloric acid having a concentration of at least about 10.5 M, the hydrophobing agent is hexamethyldisiloxane (HMDS), and the reaction is allowed to proceed for about 30 minutes at ambient temperature (about 22° C.). In another preferred embodiment, the dry silica used is fumed silica, the concentrated acid in the reaction medium is hydrochloric acid having a concentration of at least about 10.5 M, the hydrophobing agent is trimethylchlorosilane (TMCS), and the reaction is allowed to proceed for about 30 minutes at ambient temperature (about 22° C.).

An advantage of the present method is that the acid vapor formed during the surface modification reaction (i.e., the reaction of the hydrophobic agent and acid-treated silica)

can be readily recovered and recycled, thereby providing enhanced economics.

It will often be desirable to dry the treated silica after recovery. While not intending to be bound by any particular theory, it is believed that some hydrophobing agents, especially reactive organochlorosilanes, can form low molecular weight contaminants or remain in an unreacted state in the recovered silica. The presence of these low molecular weight byproducts and reactants can have a detrimental effect on the properties of the dried product, and are believed to accumulate under commonly used drying conditions. Accordingly, the present invention optionally comprises purifying the treated silica to provide a product consisting essentially of hydrophobic silica. Such purification desirably is accomplished by extracting the treated silica with an organic liquid, e.g., hemamethyldisiloxane, prior to a drying step. An acceptably complete extraction can be indicated by a thermal gravimetric analysis in which the dried, purified product loses less than about 6 wt. % when heated from 200° C. to 400° C. This embodiment of the present invention is set forth in greater detail in U.S. patent application Ser. No. 60/071,359, filed Jan. 15, 1998 (Menon et al.).

The present inventive method can be readily adapted for use in batch, semi-batch, and continuous processing, and the acid treatment can be conducted in a liquid or vapor phase, as will be appreciated by those skilled in the art, without any loss of the advantages provided by the method.

The following example further illustrates the present invention but, of course, should not be construed as in any way limiting its scope.

EXAMPLE

This example demonstrates the effect of acid-mediated hydrophobic treatment of silica wherein excess water is eliminated from the reaction medium as compared to a reaction medium in which excess water is present.

Samples of fumed silica (commercially available from Cabot Corporation under the trademark Cab-O-Sil® H5) were mixed with concentrated hydrochloric acid (12 M) and hydrophobing agent (either TMCS or HMDS) with varying amounts of excess water in the reaction medium at ambient temperature (about 22° C.) for about 30 minutes. The reaction conditions for each of the samples are set forth in Table 1 below. The resulting treated silica samples were recovered and dried at 150° C. for 1 hr. The surface area and C value of the treated silica samples were calculated using the BET model based on $N_2$ adsorption measurements at 77 K. A lower C value is indicative of a greater number of hydrophobic groups on the silica.

The nitrogen adsorption data was obtained using ASAP2000, an automated volumetric gas sorption system made by Micromeritics Corp. (Atlanta, Ga.). Prior to performing the adsorption experiment, the samples were outgassed at 180° C. at less than 0.003 mm Hg, which typically took less than 4 hours. For the adsorption experiment, the amount of nitrogen adsorbed at five different relative pressures over the range 0.05 to 0.25 was obtained and analyzed using the Brunauer-Emmett-Teller (BET) model. See Gregg et al., "Adsorption, Surface Area and Porosity" (Academic Press, New York, 1991), p. 285. The results of these measurements on each of the samples are shown in Table 1.

TABLE 1

| Sample | Fumed Silica (g) | $H_2O$ (ml) | Conc. HCl (ml) | TMCS (ml) | HMDS (ml) | Surface Area ($m^2/g$) | C Value |
|---|---|---|---|---|---|---|---|
| A | 0.5 | <0.01 | 20 | 20 | 0 | 237 | 23 |
| B | 0.5 | <0.01 | 20 | 0 | 20 | 240 | 24 |
| C | 0.5 | 10 | 20 | 0 | 20 | 257 | 35 |
| D | 0.5 | 20 | 20 | 0 | 20 | 290 | 100 |

As is apparent from a comparison of the experimental results for Samples A–D, the absence of significant excess water resulted in hydrophobic surface-treated silica having a substantially increased number of hydrophobic groups on the surface thereof (as evidenced by the decreased C value, particularly a C value of about 30 or less, and especially a C value of about 25 or less) and with a surface area consistent with such increased hydrophobic groups.

All of the references cited herein, including patents, patent applications, and publications, are hereby incorporated in their entireties by reference.

While this invention has been described with an emphasis upon preferred embodiments, it will be obvious to those skilled in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. A method of treating silica comprising:
   (a) contacting dry silica, selected from the group consisting of fumed silica, precipitated silica, silica xerogel, silica aerogel, and mixtures thereof, with a reaction medium consisting essentially of concentrated aqueous mineral acid and a hydrophobing agent selected from the group consisting of organosiloxanes and organochlorosilanes,
   (b) reacting said silica with said hydrophobing agent in said reaction medium for about 90 minutes or less at a temperature from about 10° C. to about 40° C. to provide a hydrophobic treated silica, and
   (c) recovering said hydrophobic treated silica.

2. The method of claim 1, wherein said dry silica contains less than about 5 wt. % water.

3. The method of claim 1, wherein said dry silica is fumed silica.

4. The method of claim 1, wherein said concentrated aqueous mineral acid is selected from the group consisting of sulfuric acid, hydrochloric acid, and mixtures thereof.

5. The method of claim 4, wherein said concentrated aqueous mineral acid is hydrochloric acid having a concentration of about 12 M.

6. The method of claim 4, wherein said concentrated aqueous mineral acid is hydrochloric acid having a concentration of at least about 10 M.

7. The method of claim 1, wherein said temperature is about 20–25° C.

8. The method of claim 1, wherein the reaction is allowed to proceed for about 45 minutes or less.

9. The method of claim 1, wherein said hydrophobing agent is an organosiloxane of the formula

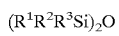

wherein $R^1$, $R^2$, and $R^3$ may be the same or different and each is a $C_1$–$C_6$ alkyl, fluoroalkyl, aryl, or arylalkyl.

10. The method of claim 9, wherein said organosiloxane is hexamethyldisiloxane.

11. The method of claim 1, wherein said hydrophobing agent is an organosiloxane of the formula:

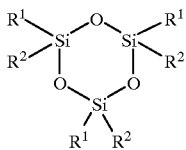

wherein $R^1$ and $R^2$ may be the same or different and each is a $C_1$–$C_6$ alkyl, fluoroalkyl, aryl, or arylalkyl.

12. The method of claim 11, wherein $R^1$ and $R^2$ are methyl.

13. The method of claim 1, wherein said hydrophobing agent is an organosiloxane of the formula:

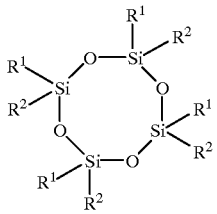

wherein $R^1$ and $R^2$ may be the same or different and each is a $C_1$–$C_6$ alkyl, fluoroalkyl, aryl, or arylalkyl.

14. The method of claim 13, wherein $R^1$ and $R^2$ are methyl.

15. The method of claim 1, wherein said hydrophobing agent is an organochlorosilane of the formula:

$R^1R^2R^3SiCl$, $R^1R^2SiCl_2$, or $R^1SiCl_3$, wherein $R^1$, $R^2$, and $R^3$ may be the same or different and each is a $C_1$–$C_6$ alkyl, fluoroalkyl, aryl, or arylalkyl.

16. The method of claim 15, wherein $R^1$, $R^2$, and $R^3$ are methyl.

17. The method of claim 16, wherein said organochlorosilane is trimethylchlorosilane.

18. The method of claim 16, wherein said organochlorosilane is dimethyldichlorosilane.

19. The method of claim 1, wherein said hydrophobing agent is an organosiloxane of the formula:

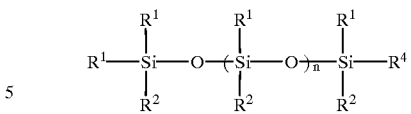

wherein n is an integer from 0 to 10; $R^1$ and $R^2$ may be the same or different and each is a $C_1$–$C_6$ alkyl, fluoroalkyl, aryl, or arylalkyl; and $R^3$ and $R^4$ may be the same or different and each is hydroxyl, $C_1$–$C_6$ alkyl, fluoroalkyl, aryl, or arylalkyl.

20. The method of claim 19, wherein $R^1$ and $R^2$ are $C_1$–$C_3$ alkyl.

21. The method of claim 19, wherein $R^1$ and $R^2$ are methyl.

22. The method of claim 21, wherein n is 1, and $R^3$ and $R^4$ are methyl.

23. The method of claim 21, wherein $R^3$ is hydroxyl and $R^4$ is methyl.

24. The method of claim 21, wherein $R^3$ and $R^4$ are hydroxyl.

25. The method of claim 1, wherein said dry silica is fumed silica, said concentrated aqueous mineral acid is hydrochloric acid having a concentration of at least about 10.5 M, said hydrophobing agent is hexamethyldisiloxane, and the reaction is allowed to proceed for about 30 minutes or less at a temperature of about 20–25° C.

26. The method of claim 1, wherein said dry silica is fumed silica, said concentrated aqueous mineral acid is hydrochloric acid having a concentration of at least about 10.5 M, said hydrophobing agent is trimethylchlorosilane, and the reaction is allowed to proceed for about 30 minutes or less at a temperature of about 20–25° C.

27. The method of claim 1, wherein said hydrophobic treated silica has a C value of 30 or less.

28. The method of claim 27, wherein said hydrophobic treated silica has a C value of 25 or less.

29. The method of claim 1, further comprising
   (d) purifying said hydrophobic treated silica recovered in step (c) by extraction with an organic solvent to provide a product consisting essentially of hydrophobic treated silica.

* * * * *